US012671927B2

(12) United States Patent

Anderson et al.

(10) Patent No.: US 12,671,927 B2

(45) Date of Patent: Jun. 30, 2026

(54) SYSTEMS AND METHODS FOR POWERING COMMUNICATION DEVICES

(71) Applicant: MSA Technology, LLC, Cranberry Township, PA (US)

(72) Inventors: Scott Anderson, Carnegie, PA (US); Kelsey Sutherland, Pittsburgh, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 276 days.

(21) Appl. No.: 18/418,650

(22) Filed: Jan. 22, 2024

(65) Prior Publication Data

US 2025/0240552 A1 Jul. 24, 2025

(51) Int. Cl.

*H04R 1/04* (2006.01)

(52) U.S. Cl.

CPC .......... *H04R 1/04* (2013.01); *H04R 2420/07* (2013.01)

(58) Field of Classification Search

CPC .............................. H04R 1/04; H04R 2420/07

See application file for complete search history.

(56) References Cited

U.S. PATENT DOCUMENTS

| | | | | |
|---|---|---|---|---|
| 6,789,205 | B1 * | 9/2004 | Patino | H04M 1/24 713/300 |
| 10,601,981 | B1 * | 3/2020 | Camps | H04M 1/724 |
| 2004/0043799 | A1 * | 3/2004 | Ishibashi | H04M 1/0256 455/566 |
| 2004/0192372 | A1 * | 9/2004 | Richards | H04M 1/05 455/557 |
| 2005/0049010 | A1 * | 3/2005 | Pinder | H04M 1/18 455/343.1 |
| 2017/0142840 | A1 * | 5/2017 | Surinya | H05K 5/0086 |
| 2017/0180971 | A1 * | 6/2017 | Schuler | H04W 8/24 |
| 2018/0090942 | A1 * | 3/2018 | Nunez | H02J 7/0045 |
| 2018/0109277 | A1 * | 4/2018 | Ooi | H04B 1/385 |
| 2019/0141508 | A1 * | 5/2019 | Alfaro | H04M 1/72421 |
| 2019/0372363 | A1 * | 12/2019 | Cutcher | H02J 7/342 |
| 2020/0044675 | A1 * | 2/2020 | Mcindoe | H04B 1/385 |
| 2021/0263703 | A1 * | 8/2021 | Jarvinen | G10L 17/24 |
| 2022/0159367 | A1 * | 5/2022 | Yamkovoy | G10K 11/17821 |
| 2023/0217218 | A1 * | 7/2023 | Cruger, Jr. | H04W 4/10 455/518 |
| 2024/0381460 | A1 * | 11/2024 | Boerger | H04W 72/541 |

OTHER PUBLICATIONS

Patent Cooperation Treaty; PCT/US2025/012313; International Search Report and Written Opinion of the International Searching Authority; May 2, 2025.

* cited by examiner

*Primary Examiner* — Oyesola C Ojo

(74) *Attorney, Agent, or Firm* — Jones Day

(57) ABSTRACT

A portable communication system having a first communication device, such as a land mobile radio (LMR), with its own battery, and a second communication device, such as a remote speaker microphone (RSM), also having its own battery. The second communication device may receive electrical energy from either the battery of the first communication device or from the battery of the second communication device, thereby allowing the communication system to effectively operate in either a wireless or a wired mode, with a reduced risk of an individual battery rendering the second communication device inoperable.

19 Claims, 8 Drawing Sheets

SYSTEMS AND METHODS FOR POWERING COMMUNICATION DEVICES

BACKGROUND

Communications devices play a critical role in ensuring effective and efficient communication between individuals conducting various tasks, including emergency responders (e.g., firefighters). For example, emergency responders will often utilize communications devices for real-time communication and coordination among team members, enabling them to share vital information, coordinate their actions, and make informed decisions in the field. In many such emergency situations, clear and reliable communication is paramount for the safety and success of many emergency response operations.

SUMMARY

Systems and methods are provided for electronics devices, such as communication devices, that may utilize a first communication device (such as a land mobile radio (LMR)) having a first battery (such as an "LMR battery") in communication with a second communication device (such as a remote speaker microphone (RSM)) that has its own battery (such as an "RSM battery"). For instance, an RSM may be optionally powered using either an LMR battery or an RSM battery, which may provide the system numerous advantages. For instance, the RSM may be designed to communicate to the LMR either wirelessly (e.g., via Bluetooth connection) or through a wired connection, and the user or the system may controllably switch between these two power sources and communication modes, as desirable. This arrangement can permit the RSM battery to power the RSM when in wireless mode, but may permit the RSM to rely on either the RSM battery or the LMR battery when in wired mode. That way, if the RSM battery "runs out" of energy, the LMR battery may be relied on to ensure the continued operation of both the RSM and the LMR. Similarly, if the RSM is relying on the LMR battery for power, but becomes disconnected from the LMR, the RSM can switch to relying on the RSM battery for power, and thereby continue to function.

In one aspect, the present disclosure provides a portable communication system. The portable communication system may include a land mobile radio (LMR) having an LMR battery as well as a remote speaker microphone (RSM) having an RSM battery. The RSM may be configured to receive audio signals from a user and provide the audio signals to the LMR. The RSM may be configured to selectively receive electrical energy from either the RSM battery or the LMR battery.

In another aspect, the present disclosure provides a remote speaker microphone (RSM) for use in a portable communication system. The RSM may include a microphone configured to receive audio signals from a user and a communications unit configured to provide the audio signals to a land mobile radio (LMR), wherein the RSM may be configured to provide the audio signals both wirelessly and using a wired connection. Additionally, the RSM may include an RSM battery in electrical communication with the communications unit.

In one aspect, the present disclosure provides a portable communication system. The communication system may include a first communication device having a radio transceiver and a first battery and a second communication device having a second battery. The second communication device may be configured to receive audio signals from a user, and provide the audio signals to the first communication device. The second communication device may be configured to selectively receive electrical energy from the first battery or the second battery.

In another aspect, the present disclosure provides a portable communication system. The communication system may include a land mobile radio (LMR) having an LMR battery and a remote speaker microphone (RSM) having an RSM battery. The RSM may be configured to selectively receive electrical energy from either the RSM battery or the LMR battery when the RSM and the LMR are in electrical communication via a wire connection, and to receive electrical energy from the RSM battery when the RSM and the LMR are not in electrical communication via the wire connection.

Figure 1A:
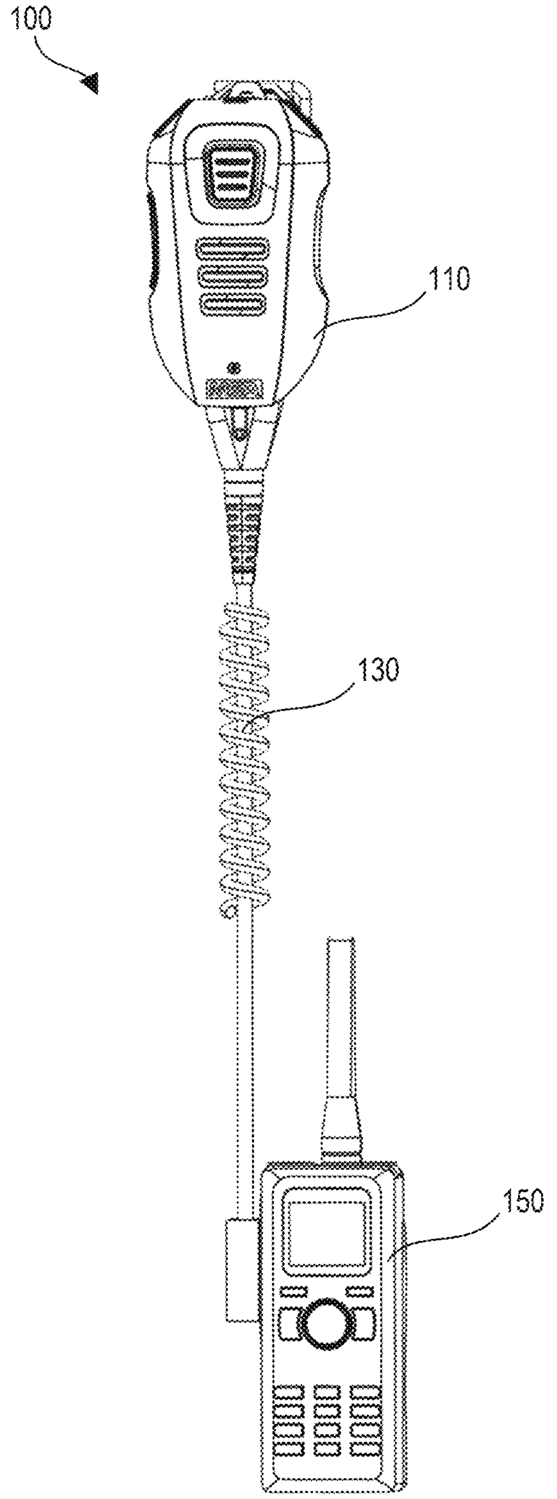
FIG. 1A is a diagram illustrating a front view of a portable communication system, in accordance with one aspect of the present disclosure.

The current subject matter will be better understood by reference to the following detailed description when considered in combination with the accompanying drawings which form part of the present specification.

DETAILED DESCRIPTION

Often times, communication devices will be used to provide a lifeline for emergency responders operating in hazardous environments. For instance, these devices, which are often handheld or attached to the emergency responder's equipment or clothing, may allow a user to stay connected with an incident command center, providing essential updates on their location, progress, and potential dangers they encounter. This two-way communication between the command center and individual responders ensures that commanders can closely monitor the situation, provide guidance, and deploy necessary resources promptly. Additionally, in the event of distress or injury, personal communications devices allow emergency responders to call for help, enhancing their personal safety.

Common communication devices used by emergency responders include land mobile radio (LMR) systems. LMRs function by converting voice or data into radio frequency signals, transmitting these signals via radio waves, and receiving and demodulating these signals by other radios within the communication range. The technology allows for reliable, real-time communication essential for public safety and emergency response operations. Because LMRs are often carried by or attached to an emergency responder, the battery systems which power the LMRs are critically important to ensuring continued operability of the device during an emergency situation. Battery-powered LMRs provide the necessary portability and mobility, allowing responders to carry and use their radios without being tethered to a fixed power source. Emergency responses can be prolonged, requiring first responders to be in the field for extended periods of time, and a battery of an LMR preferably enables it to operate continuously without the need for frequent recharging, thereby ensuring that responders stay connected throughout the duration of their missions.

Land mobile radio (LMR) systems provide person-to-person voice communication via two-way radio transceivers (an audio transmitter and receiver in one unit) which can be stationary (e.g., control station units), mobile (e.g., installed in a vehicle dashboard), or portable (e.g., handheld transceivers). The present disclosure recognizes that such portable arrangements often include both an LMR unit and a remote speaker microphone (RSM) that is connected to the LMR unit. While many control station units rely exclusively on the remote speaker microphone to capture audio signals from a user, portable arrangements may capture (e.g., through a microphone) and produce (e.g., through a speaker) audio signals from both the LMR and the RSM. The RSM may operate by first providing the audio signals it receives to the LMR, and then relying on the components of the LMR (e.g., communications unit, antenna, etc.) to further transmit these signals to other LMR systems operating within range. The RSM is typically incapable of operating once disconnected from the LMR, since the RSM relies on the LMR for electrical power.

Unfortunately, among other disadvantages, the present disclosure recognizes that traditional LMR systems struggle to operate effectively in various emergency situations. For instance, the wire connection between the LMR and the RSM may snag on an object as a user is navigating an emergency site and therefore become unplugged or permanently severed. Once unplugged or severed, the user may no longer be able communicate through the RSM, and therefore may lose precious time trying to reconfigure the LMR system and communicate with other users at the emergency site. The present disclosure also recognizes that simply modifying the LMR system to operate wirelessly comes with its own drawbacks, including potential connection issues, and the introduction of yet another battery to be maintained, and that could potentially fail in the field.

In order to address these deficiencies, the present disclosure provides, in part, systems and methods that utilize a first communication device (e.g., RSM) that controllably relies on either the battery of another communication device (e.g., LMR) or a battery within the first communication device itself to function. By providing numerous sources of power that, for example, the RSM can draw from, the communication system described herein may effectively operate either wirelessly or through a wired connection, thereby providing a user multiple communication modes to choose from. This arrangement provides numerous advantages in the field. For instance, if the connection wire between the RSM and the LMR is damaged, the system may automatically switch to operating in a wireless mode and relying on the RSM battery to power the RSM. Likewise, if the RSM battery is being used to power the RSM but has a low state of charge, the system or the user may switch to relying on the LMR battery for power. In some aspects, the reverse technique may also be applied if the LMR battery is low on energy. In this manner, the communication systems described herein may advantageously provide flexibility and versatility to a user (e.g., an emergency responder in the field), helping to ensure that the user may continue to effectively communicate, even during emergency situations that extend for an appreciable period of time.

Although the example systems and methods discussed herein primarily relate to land mobile radio systems, a skilled artisan should readily appreciate that the techniques described herein can be applied to other electronic communication devices that may benefit from two or more battery powered communication devices operating in close proximity.

Figure 1B:
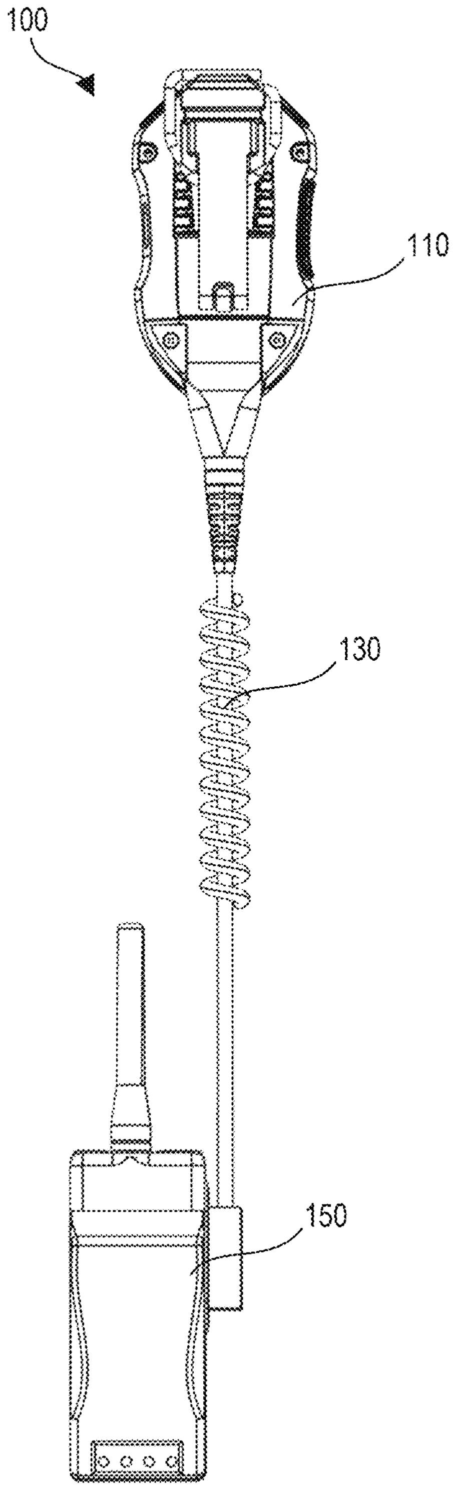
FIG. 1B is a diagram illustrating a rear view of the portable communication system of FIG. 1A, in accordance with one aspect of the present disclosure.

FIGS. 1A-1B depict front and rear views of a portable communication system 100. The communication system includes a remote speaker microphone (RSM) 110 connected to a land mobile radio (LMR) 150 via a connecting wire 130. In general, both the RSM 110 and the LMR 150 may be configured to capture audio signals (e.g., spoken communication) from a user (e.g., emergency responder) that may be transmitted to other communication systems within a transmission range of the LMR 110 and operating on the same frequency range (e.g., radio-frequency range). Likewise, both the LMR 150 and the RSM 110 may be configured to provide audio signals to a user. Generally, when the RSM 110 is connected to the LMR 150, the audio signals may be solely provided by the RSM 110 to the user.

While the LMR 150 may be generally configured to provide the audio signals to other communication systems, including those captured by the RSM 110, the RSM 110 may include its own transmission capabilities. For instance, in some aspects, the RSM 110 may be configured to communicate with other similar RSMs operating in close proximity, without relying on the LMR 150. In such aspects, the LMR 150 may serve to establish communication with other systems or devices positioned at a greater distance away from the communication system 100. In this manner, the RSM 110 and LMR 150 may provide different communication capabilities to a user of the communication system 100.

As will be further described, the RSM 110 and LMR 150 may be configured to operate in either a wired mode (i.e., with the connection wire 130 connecting the two devices) or in a wireless mode (e.g., through Bluetooth transmission). In order to effectively achieve these dual operating modes, the RSM 110 may include its own battery, and may further be configured to receive electrical energy from the LMR 150 for power. The electrical energy may be transferred through the connection wire 130 to the RSM (or vice versa) at the same time that information signals (e.g., audio signals) are transferred through the connection wire 130.

Figure 2:
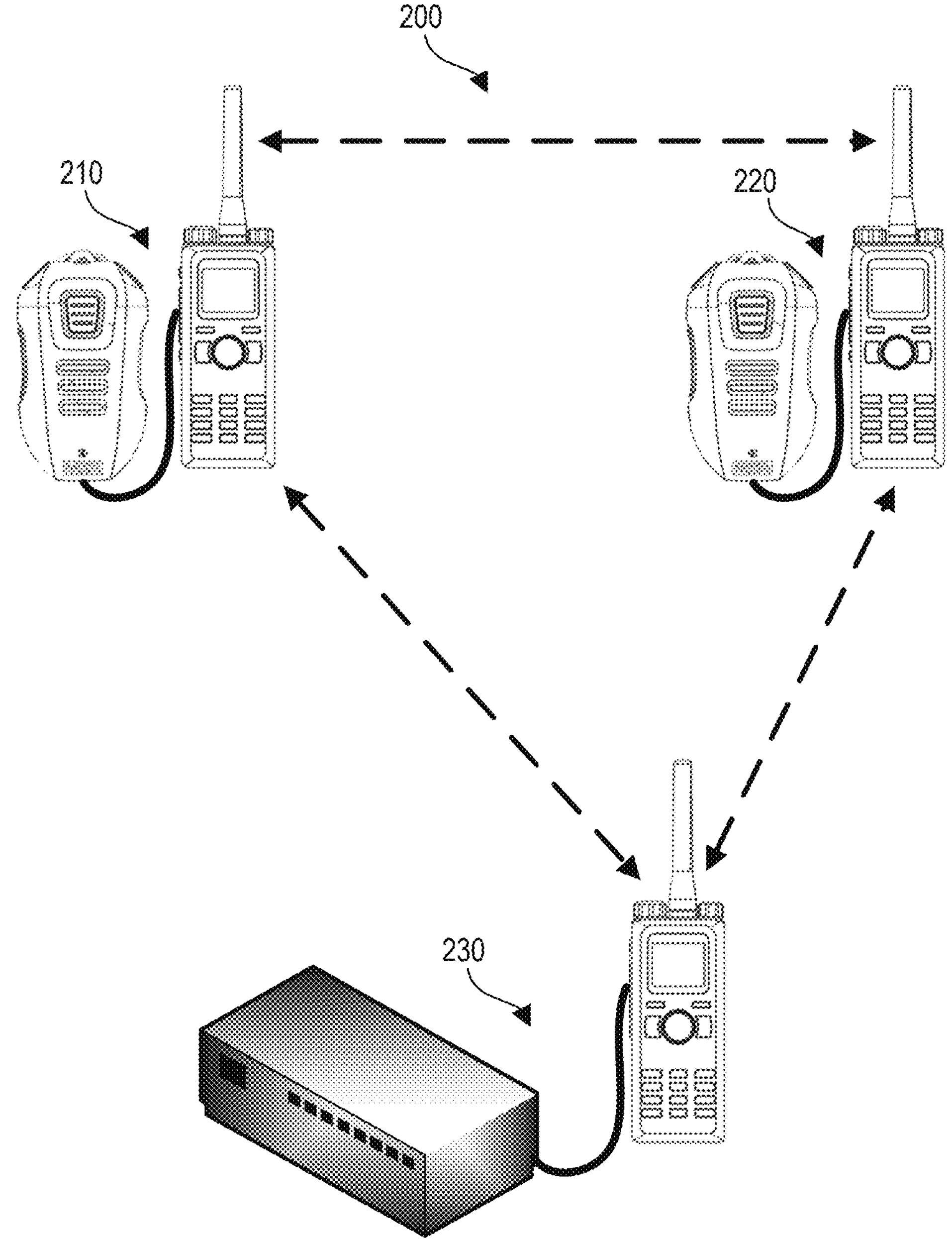
FIG. 2 is a diagram illustrating multiple portable communication systems and a control station communication unit, in accordance with one aspect of the present disclosure.

FIG. 2 depicts multiple portable communication systems 210, 220 shown in wireless communication (using dotted arrows) with a control station communication unit 230 (e.g., command center, radio tower, etc.). As described with respect to the communication systems depicted in FIGS. 1A-1B, the portable communication systems 210, 220 may be configured to provide audio signals to one another via their respective LMRs, as well as to the control station communication unit 230. The control station communication unit may serve as a central control hub (i.e., command center) where a user (e.g., commander) may provide various instructions to other users (e.g., firefighters) within an emergency site (e.g., a building on fire). As described, the RSMs may also function to provide similar communication capabilities, provided the RSMs are within close proximity. While the present disclosure often describes the transfer of audio signals, it should be readily appreciated that other information can be wirelessly transferred between the communication devices. For instance, each RSM may include an emergency alert button capable of being pressed by a user, and the fact that a user has pressed such an emergency alert button may be communicated to other systems and devices in range.

Figure 3:
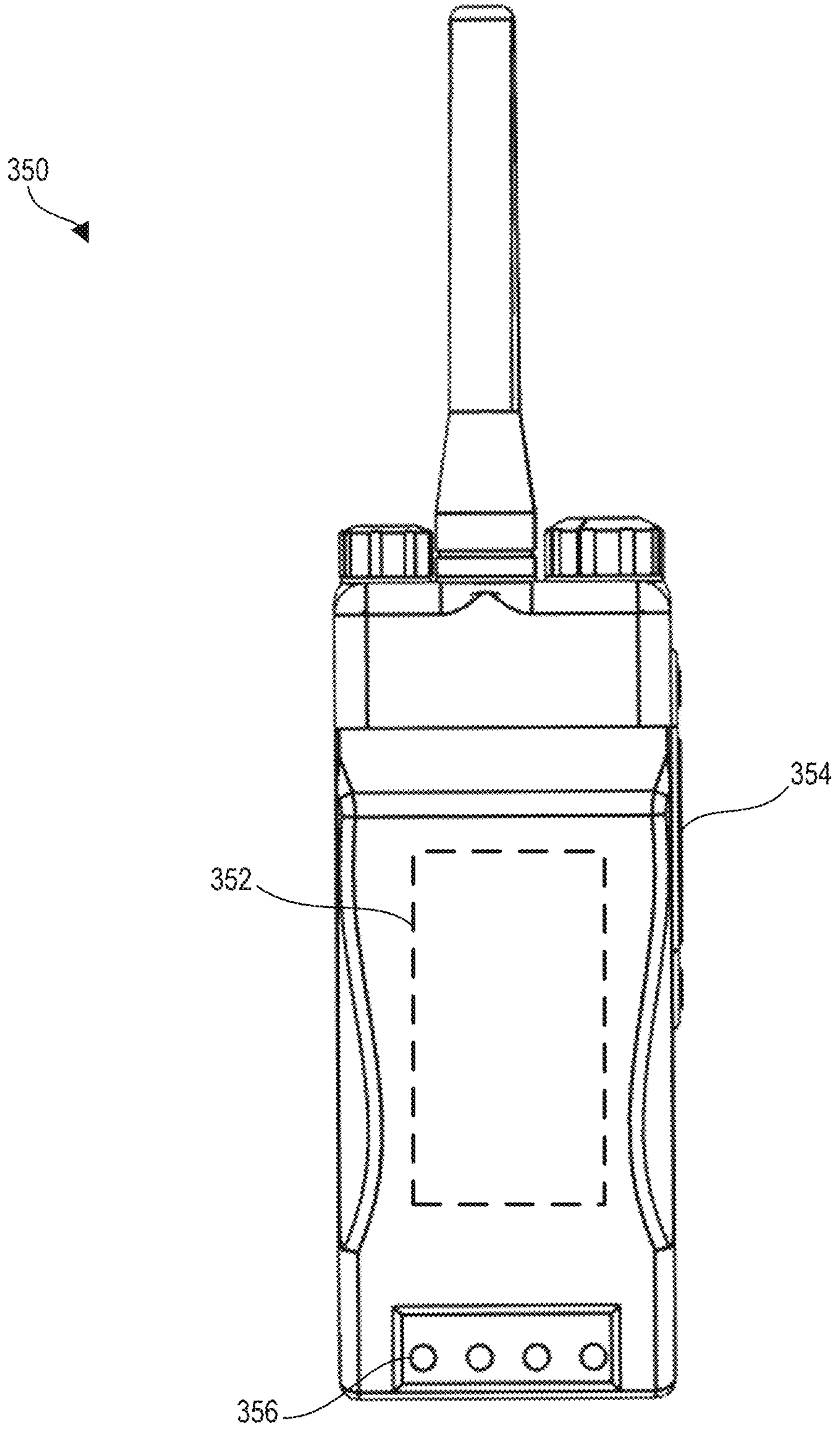
FIG. 3 is a diagram illustrating a rear view of a land mobile radio (LMR) of a portable communication system, in accordance with one aspect of the present disclosure.

FIG. 3 depicts a land mobile radio (LMR) 350 of a portable communication system, such as the one depicted in FIGS. 1A-1B. In this illustration, various components associated with the transfer of electrical energy have been identified, including the LMR battery 352 (illustrated as a dotted box), the LMR connection port 354 (also referred to as a physical interface port), and an LMR charging port 356. A charging device may couple to the charging port 356 in order to charge the LMR battery 352. In some aspects, the LMR battery 352 may be positioned on an exterior of the LMR 350 and configured to be easily removable, such that it can be quickly swapped out for a fully-charged battery when depleted. The energy from the LMR battery 352 may be used to power the LMR 350, and optionally also an RSM, by transferring electrical energy through a connection wire coupled to the LMR connection port 354. These and various other potential components and the functionality of the LMRs described herein are detailed further in FIG. 6 of the present disclosure.

Figure 4:
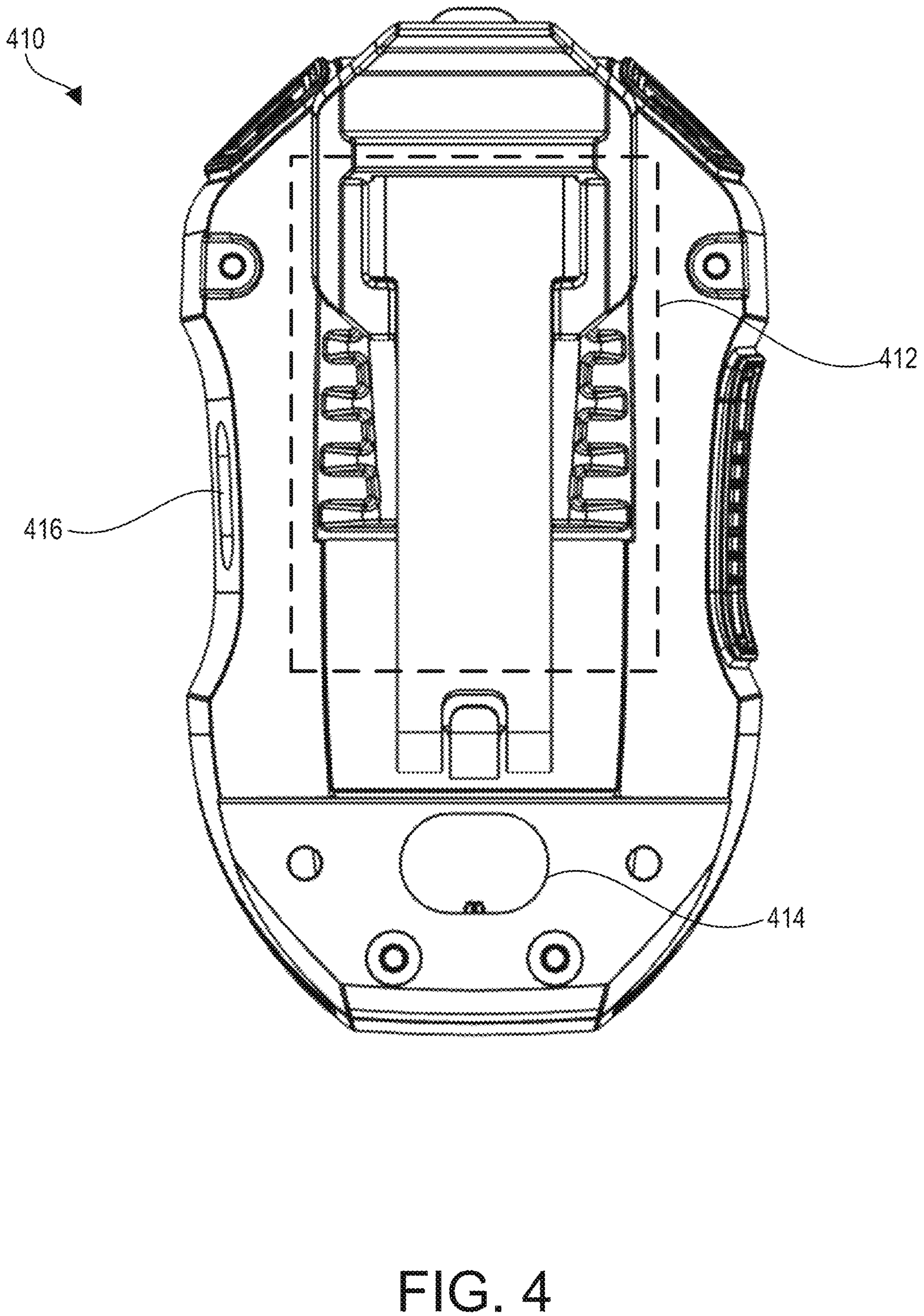
FIG. 4 is a diagram illustrating a rear view of a remote speaker microphone (RSM) of a portable communication system, in accordance with one aspect of the present disclosure.

FIG. 4 depicts a remote speaker microphone (RSM) 410 of a portable communication system, such as the one depicted in FIGS. 1A-1B. In this illustration, various components associated with the transfer of electrical energy have been identified, including the RSM battery 412 (illustrated as a dotted box), the RSM connection port 414 (also referred to as a physical interface port), and an RSM charging port 416. A charging device may couple to the charging port 416 in order to charge the RSM battery 412. In some aspects, and in order to ensure waterproofing, the RSM battery 412 may be positioned within the interior of the RSM 410 in a manner where it may not be accessible without the use of tools, and therefore may not be configured to be quickly swapped out for a fully-charged battery once depleted. For instance, the RSM battery 412 may be contained within a sealed enclosure of the RSM 410. The energy from the RSM battery 412 may be used to power the RSM 410. Additionally, the RSM 410 may receive transferred electrical energy from an LMR through a connection wire coupled to the RSM connection port 414. These and various other potential components and the functionality of the RSMs described herein are further detailed in FIG. 6 of the present disclosure.

Figure 5A:
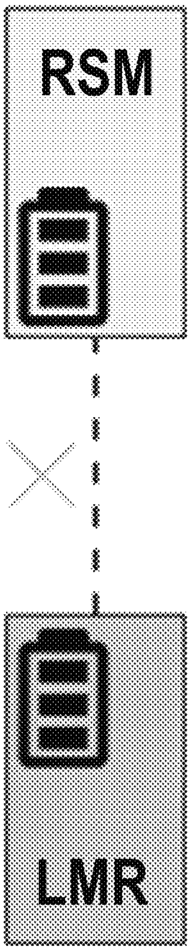
FIG. 5A is a diagram illustrating a portable communication system operating in a wireless mode, in accordance with one aspect of the present disclosure.
Figure 5B:
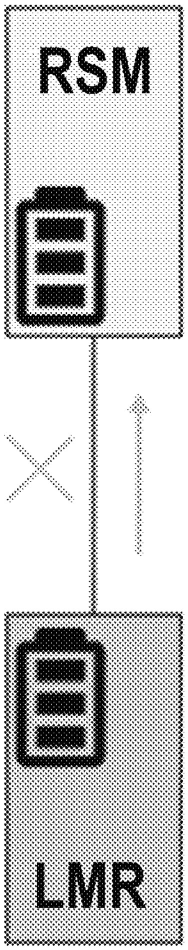
FIG. 5B is a diagram illustrating a portable communication system operating in a wired mode but relying on a battery within the RSM to power the RSM, in accordance with one aspect of the present disclosure.
Figure 5C:
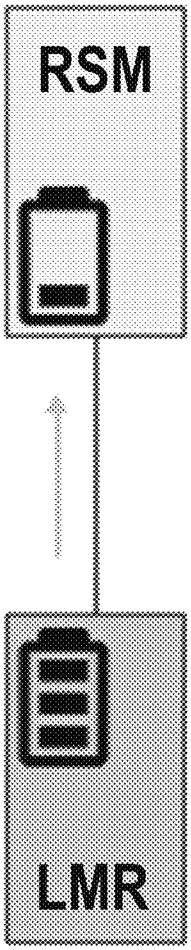
FIG. 5C is a diagram illustrating a portable communication system operating in a wired mode and relying on a battery within the LMR to power the RSM, in accordance with one aspect of the present disclosure.

FIGS. 5A-5C depicts a portable communication system, such as the communication system depicted in FIGS. 1A-1B, operating in various power modes. FIG. 5A depicts the communication system operating in a wireless mode, with both the RSM and the LMR powered via their own respective batteries and relying on wireless communication techniques to transfer information (e.g., audio signals). While the RSM and the LMR may still be connected when operating in such a wireless mode, they need not be. FIG. 5B depicts the communication system operating in a wired mode with the RSM being powered by the RSM battery. In such a configuration, the wired connection between the RSM and the LMR may be used to transfer information signals, but not to transfer electrical energy to power either of the devices. In other words, both the RSM and the LMR may still rely on their own batteries for power, but may utilize the secure wired connection to transfer information. FIG. 5C depicts the communication system operating in a wired mode with the RSM relying on a battery within the LMR to power the RSM. Accordingly, the battery of the LMR may be used to power both the LMR and the RSM, while the connection wire is also used to transfer information. This third mode may be useful, for example, when the RSM battery is depleted (as shown) to a point where it can no longer power the RSM. Although not depicted, it should be appreciated that a fourth mode that reverses the arrangement in the third mode is possible. For example, the communication system may operate in a wired mode with the LMR relying on a battery within the RSM to power the LMR. In such a mode, the battery of the RSM may be used to power both the LMR and the RSM, while the connection wire is also used to transfer information. This fourth mode may be useful where the battery of the LMR is depleted to the point where it can no longer power the LMR.

Figure 6:
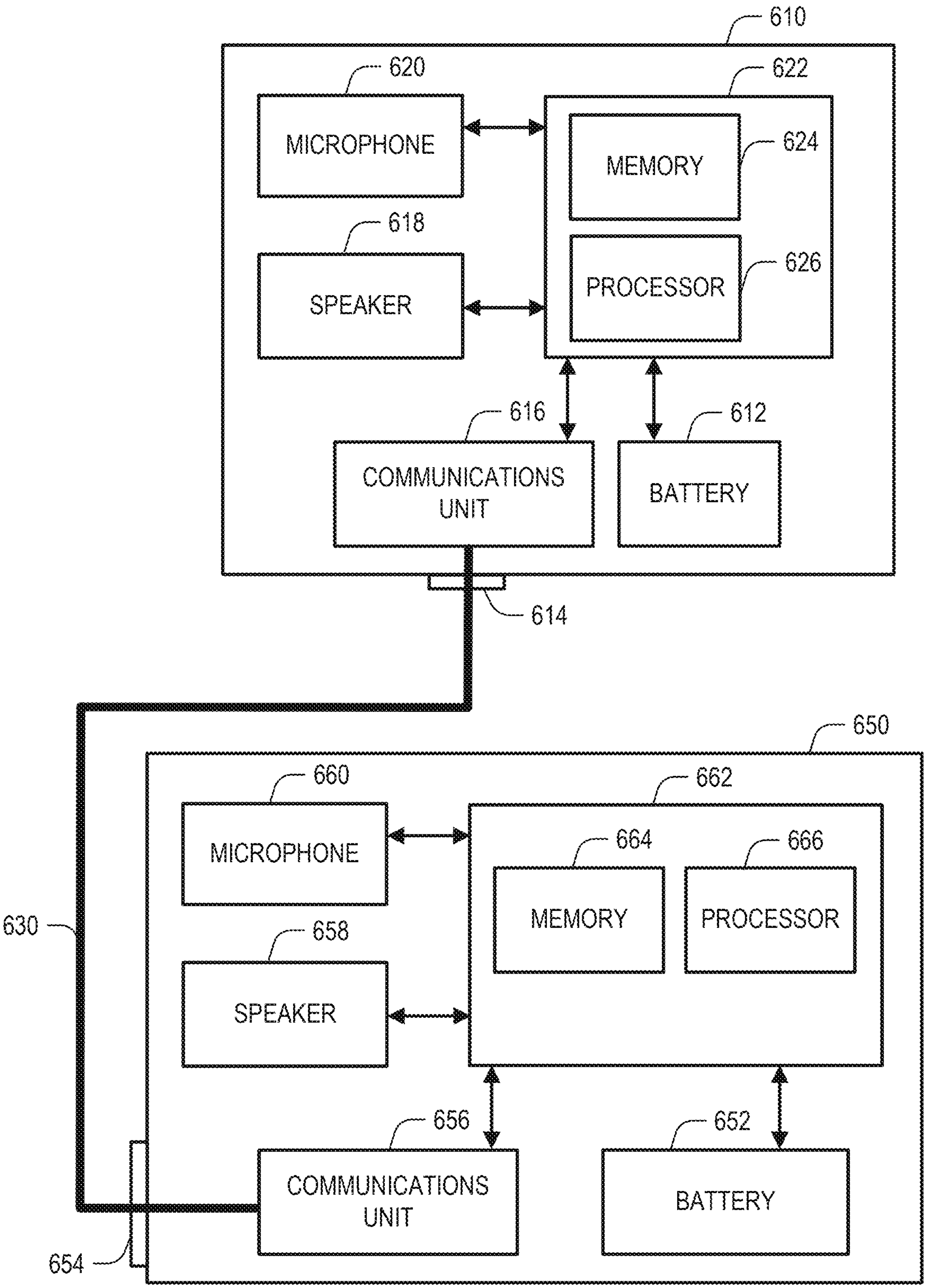
FIG. 6 is a diagram illustrating various components within a portable communication system, in accordance with one aspect of the present disclosure.

FIG. 6 depicts various components within a portable communication system, such as the communication system of FIGS. 1A-1B, formed of a remote speaker microphone (RSM) 610 connected to a land mobile radio (LMR) 650 via a wired connection 630. As shown, the RSM 610 may include various subcomponents, including a controller 622 having at least one memory 624 and at least one processor 626. The RSM controller 622 is shown in electrical connection with an RSM microphone 620, an RSM speaker 618, an RSM battery 612, and an RSM communications unit 616. Likewise, the LMR 650 may also include various subcomponents, including a controller 662 having at least one memory 664 and at least one processor 666. The LMR controller 622 is shown in electrical connection with an LMR microphone 660, an LMR speaker 658, an LMR battery 652, and an LMR communications unit 656. In general, the RSM microphone 620 and the LMR microphone 660 may record audio signals from a user, which may be transmitted to another communication system in range, while the RSM speaker 618 and the LMR speaker 658 may function to produce sound based on audio signals received from other communication systems or devices, as well as audio signals produced by each devices controller (e.g., alert signals, operating signals). Although not depicted, it should be readily appreciated that the RSM and LMR may include additional components not shown is this limited diagram, including but not limited to, buttons, switches, screens, charging ports, attachments, and sensors.

As previously described, the RSM 610 may rely on the LMR battery 652 for power in some operating modes. The communication system may include switching circuitry (not depicted) configured to control when the LMR battery 652 is transferring electrical energy to the RSM 610. The switching circuitry may be specifically located within the RSM 610. For instance, the switching circuitry may be at least partially located within the RSM controller 622, or alternatively in close proximity to, and in electrical connection with, the RSM battery 612. Although any suitable switching circuitry may be utilized, the switching circuitry may specifically include eFuses or electronics fuses (hot swap controller), or a similar component. Relatedly, and optionally as a part of the switching circuitry, the RSM 610, the LMR 650, or both devices may include a manual user switch, such as a button switch, on an exterior surface. In this manner, a user may be able to manually control whether the RSM 610 is receiving electrical energy from the RSM battery 612 or from the LMR battery 652.

The RSM communications unit 616 may be in communication with the LMR communications unit 656 through the connection wire 630, which may couple to an RSM connection port 614 and an LMR connection port 654. As described, the RSM communications unit 616 and the LMR communications unit 656 may include different components, and therefore function with different ranges and abilities. For example, the LMR communications unit 656 may include an extended antenna, which may serve to expand the communication range of the LMR 650. Both the RSM communications unit 616 and the LMR communications unit 656 may include a transmitter configured to wirelessly transmit radio-frequency communication signals and a receiver configured to receive radio-frequency communication signals. For instance, each device may include a transceiver capable of both transmitting audio signals from the microphones 620, 660 as well as producing sound from received audio signals using the speakers 618, 658. Additionally, the communications units 616, 656 may be configured to communicate wirelessly with each other, such as using a Bluetooth or similar connection, in order to permit the communication system to operate in a wireless mode. Beyond communicating wirelessly with the LMR communications unit 656, the RSM communications unit 616 may be configured to communicate wirelessly with other RSMs that have similar communication capabilities. In this manner, a user may communicate with another operator using solely the RSM communications unit 656, and without relying on the LMR communications unit 656. This RSM-to-RSM communication capability may provide various advantages, such as providing users a second communication capability and thereby improving safety redundancies. Furthermore, the RSM-to-RSM communication may be used to provide alternative information beyond voice communication to other operators nearby.

The LMR controller 662 as well as the RSM controller 622 may function to control various operations of the LMR 650 and RSM 610 respectively, including which operating mode the two devices are currently using for communication as well as power. For example, the RSM 610 may be configured to automatically switch to receiving electrical energy from the RSM battery 656 (i.e., switch into wireless mode) when the wire connection 630 is determined to no longer provide an electrical communication between the LMR 650 and the RSM 610 (i.e., when the devices become disconnected from each other). This determination may be made by the LMR processor 666, the RSM processor 626, or both processors, using signal information. In such a situation, the communications units 616, 656 may also switch from communicating via the connection wire 130 to communicating wirelessly. As another example, the RSM 610 may be configured to automatically switch to being powered by the LMR battery 652 when the RSM battery 612 is below a predetermined level (e.g., below 1% of its operating range). This determination may be made by the LMR processor 666, the RSM processor 626, or both processors, and may be made from various battery data, such as from a voltage sensor or battery fuel gauge connected to the RSM battery 612. These controlled switches may be made using the aforementioned switching circuitry. It should be readily appreciated that there are numerous additional situations where it may be advantageous to controllably switch between the various power and communication modes described herein.

The RSM described herein may be configured to universally function with any suitable LMR system. Because different LMR systems may be designed to provide different output voltages to the RSM via the connection wire, the RSM may include components configured to modify (e.g., controllably reduce) the voltage of the electrical energy received from the LMR. In this manner, the RSM may efficiently operate using either its internal battery or from power received from the LMR.

Figure 7:
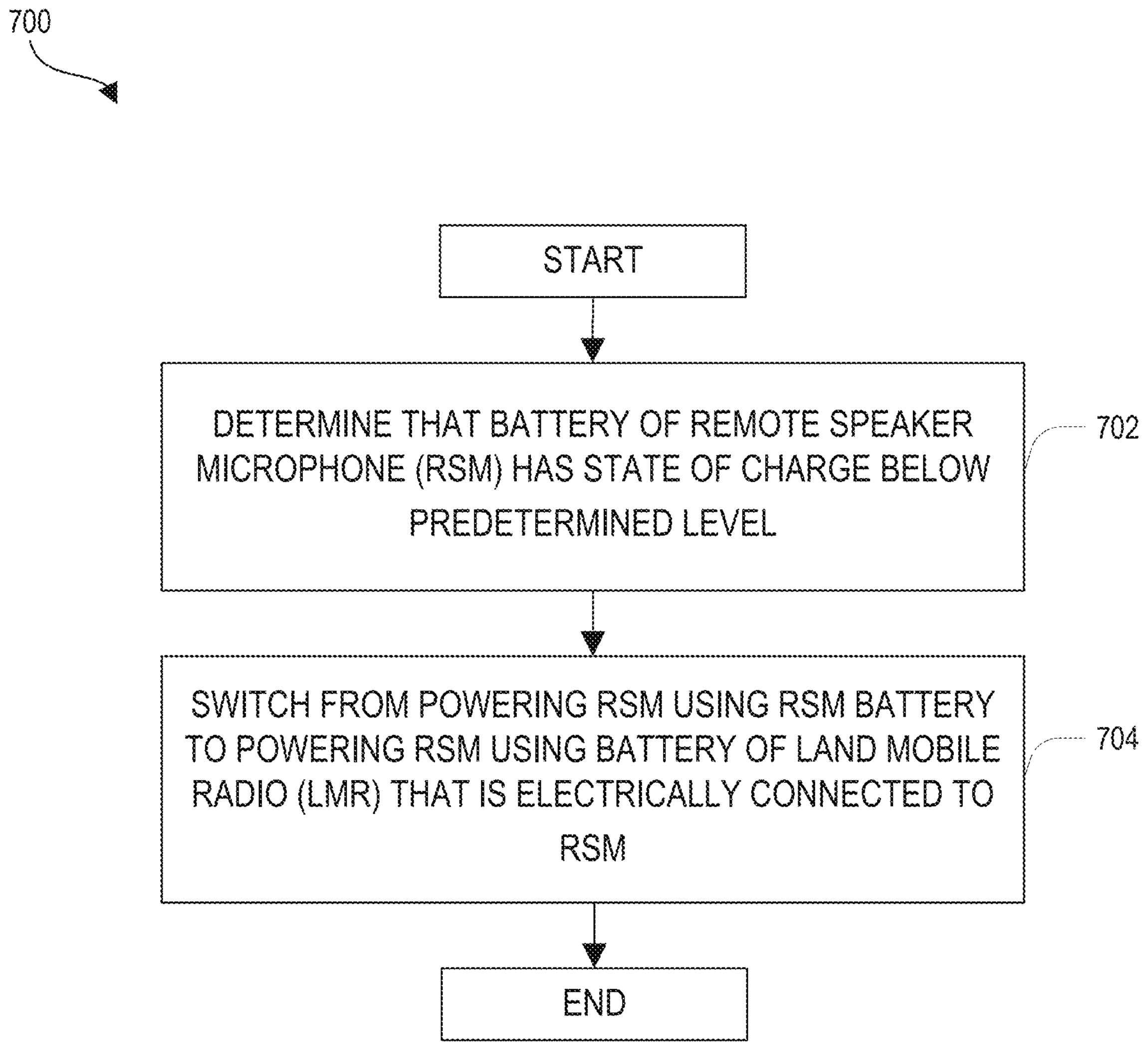
FIG. 7 is a diagram illustrating a method of powering a communication system device, in accordance with one aspect of the present disclosure.

FIG. 7 depicts a method of powering a communication system device. At 702, it is determined whether a battery of a remote speaker microphone (RSM) has state of charge of below a predetermined level. For example, the predetermined level may be the lower limit of the operating range of the battery (i.e., when the battery is no longer capable of effectively operating). This determination may be made by, for example, either a controller within the RSM or a controller within the LMR. At 704, powering the RSM using the RSM battery may be switched to powering the RSM using a battery of a land mobile radio (LMR) that is electrically connected to the RSM. As previously described, this controlled switch may occur automatically, and either the RSM or the LMR may implement this change through switching circuitry. Alternatively, a user may make this change manually, such as by flipping a user switch on the RSM. The communication system may be configured to prompt the user to make this decision, such as by providing a visual or audio indication when the RSM battery is approaching or has reached its lower limit (i.e., when the RSM battery is dead).

Figure 8:
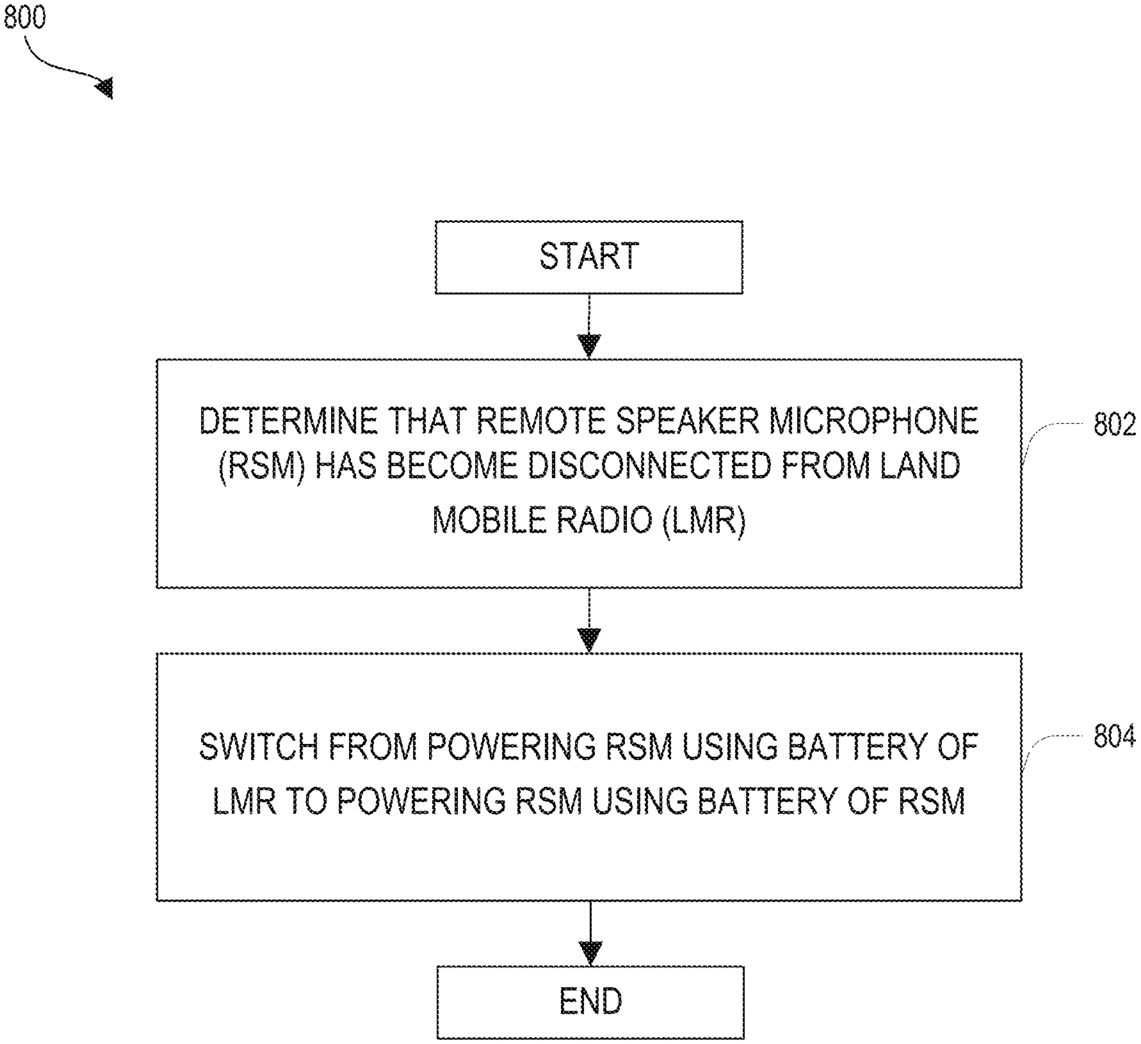
FIG. 8 is a diagram illustrating a method of controlling a communication system, in accordance with one aspect of the present disclosure.

FIG. 8 is a diagram illustrating a method of controlling a communication system, in accordance with one aspect of the present disclosure. At 802, it is determined that a remote speaker microphone (RSM) has become disconnected from a land mobile radio (LMR). Such disconnection may occur for example, as a result of severance of a connection wire, or disconnection at a port of either the RSM or the LMR. At 804, powering the RSM using a battery of the LMR may be switched to powering the RSM using a battery of the RSM. As previously described, this controlled switch may occur automatically, and either the RSM or the LMR may implement this change through switching circuitry. Alternatively, a user may make this change manually, such as by flipping a user switch on the RSM.

As far as durability, which may be particularly useful for emergency responder applications, the devices described herein may be formed of materials that have heat-resistant properties, and may specifically be configured to substantially maintain their intended geometries and functionality up to at least 350 degrees Fahrenheit. The electronic devices described herein may be specifically configured to pass various temperature, pressure, and mechanical tests. Emergency responder communication devices in particular are often subjected to high temperatures and extensive water exposure. Accordingly, the electronics devices described herein may be constructed using particular materials and design techniques to remain functional in extreme conditions. The electronics devices may be configured satisfy the heat and immersion requirements outlined in the U.S. National Fire Protection Association (NFPA) 1802, Section 8.3.

While the disclosure has been described in detail and with reference to specific embodiments thereof, it will be apparent to one skilled in the art that various changes and modifications can be made therein without departing from the spirit of the embodiments. Thus, it is intended that the present disclosure cover the modifications and variations of this disclosure provided they come within the scope of the appended claims and their equivalents.

It is claimed:

1. A portable communication system comprising: a land mobile radio (LMR) having an LMR battery;

a remote speaker microphone (RSM) having an RSM battery, the RSM configured to: receive audio signals from a user; and provide the audio signals to the LMR, switching circuitry that comprises a switch or a fuse, wherein the RSM is configured to selectively receive electrical energy from either the RSM battery or the LMR battery, and wherein the switching circuitry is configured to control whether the RSM receives electrical energy from the RSM battery or the LMR battery.

2. The portable communication system of claim 1, further comprising:

a wire connection in electrical communication with the LMR and the RSM, wherein the wire connection is configured to at least one of transfer the electrical energy from the LMR battery to the RSM and transfer the provided audio signals from the RSM to the LMR.

3. The portable communication system of claim 1, wherein the RSM is configured to wirelessly provide the audio signals to the LMR.

4. The portable communication system of claim 2, wherein the RSM is configured to switch to receiving electrical energy from the RSM battery when the wire connection is determined to no longer provide an electrical communication between the LMR and the RSM.

5. The portable communication system of claim 1, wherein the RSM is configured to switch to receiving electrical energy from the LMR battery when the state of charge of the RSM battery is below a predetermined level.

6. The portable communication system of claim 1, wherein the switching circuitry includes eFuses positioned within the RSM.

7. The portable communication system of claim 1, wherein the RSM includes a user switch configured to control whether the RSM is powered by the RSM battery or the LMR battery.

8. The portable communication system of claim 1, wherein the RSM is configured to modify the voltage of the electrical energy received from the LMR.

9. The portable communication system of claim 1, wherein the RSM includes:

an RSM transmitter configured to wirelessly transmit a radio-frequency communication signal; and an RSM receiver configured to receive a radio-frequency communication signal.

10. A remote speaker microphone (RSM) for use in a portable communication system, the RSM comprising:

a microphone configured to receive audio signals from a user;

a communications unit configured to provide the audio signals to a land mobile radio (LMR), wherein the RSM is configured to provide the audio signals both wirelessly and using a wired connection;

switching circuitry in electrical communication with the communications unit, the switching circuitry being configured to control whether the RSM is powered by the RSM battery or an external power source; and an RSM battery in electrical communication with the communications unit;

wherein the RSM is configured to determine if the RSM becomes disconnected from the LMR; and control the switching circuitry to switch from powering the RSM using an external power source to powering the RSM using the RSM battery when the RSM becomes disconnected from the LMR.

11. The RSM of claim 10, wherein the RSM is configured to receive electrical energy from a battery of the LMR while providing audio signals to the LMR.

12. The RSM of claim 10, wherein the RSM is configured to:

determine that the RSM battery has state of charge of below a predetermined level; and control the switching circuitry to switch from powering the RSM using the RSM battery to powering the RSM using an external power source when the state of charge is below the predetermined level.

13. The RSM of claim 10, wherein the communications unit includes:

a transmitter configured to wirelessly transmit a radio-frequency communication signal; and a receiver configured to receive a radio-frequency communication signal.

14. The RSM of claim 10, further comprises:

a user switch in electrical communication with the switching circuitry, wherein the user switch is configured to control the switching circuitry to adjust whether the RSM is powered by the RSM battery or an external power source.

15. The RSM of claim 10, wherein the RSM is configured to modify the voltage of the electrical energy received from the external power source.

16. The RSM of claim 10, wherein the RSM battery is contained within a sealed enclosure of the RSM.

17. A portable communication system comprising:

a first communication device having a radio transceiver and a first battery;

a second communication device having a second battery, the second communication device configured to:

receive audio signals from a user; and provide the audio signals to the first communication device, wherein the second communication device is configured to selectively receive electrical energy from the first battery or the second battery, and wherein the second communication device is configured to modify the voltage of the electrical energy received from the external power source.

18. The portable communication system of claim 1, wherein the LMR is configured to receive power from the RSM battery.

19. The portable communication system of claim 1, wherein the RSM is configured to wirelessly communicate with other nearby RSMs.

* * * * *